(12) United States Patent
Chuang

(10) Patent No.: US 11,000,830 B2
(45) Date of Patent: May 11, 2021

(54) LOW COST IMMOBILIZED AMINE REGENERABLE SOLID SORBENTS

(71) Applicant: Steven S. C. Chuang, Hudson, OH (US)

(72) Inventor: Steven S. C. Chuang, Hudson, OH (US)

(73) Assignee: The University of Akron, Akron, OH (US)

( * ) Notice: Subject to any disclaimer, the term of this patent is extended or adjusted under 35 U.S.C. 154(b) by 262 days.

(21) Appl. No.: 16/135,671

(22) Filed: Sep. 19, 2018

(65) Prior Publication Data

US 2019/0015816 A1    Jan. 17, 2019

Related U.S. Application Data

(62) Division of application No. 13/978,657, filed as application No. PCT/US2010/054277 on Jan. 7, 2011, now abandoned.

(51) Int. Cl.

| | |
|---|---|
| *B01J 20/32* | (2006.01) |
| *B01D 53/02* | (2006.01) |
| *B01D 53/81* | (2006.01) |
| *B01J 20/04* | (2006.01) |
| *B01J 20/34* | (2006.01) |
| *B01D 53/50* | (2006.01) |
| *B01J 20/10* | (2006.01) |

(Continued)

(52) U.S. Cl.
CPC .......... *B01J 20/3289* (2013.01); *B01D 53/02* (2013.01); *B01D 53/508* (2013.01); *B01D 53/62* (2013.01); *B01D 53/81* (2013.01); *B01J 20/043* (2013.01); *B01J 20/103* (2013.01); *B01J 20/22* (2013.01); *B01J 20/3204* (2013.01); *B01J 20/3219* (2013.01); *B01J 20/3223* (2013.01); *B01J 20/3242* (2013.01); *B01J 20/3251* (2013.01); *B01J 20/3425* (2013.01); *B01J 20/3483* (2013.01); *B01D 2252/204* (2013.01); *B01D 2253/106* (2013.01); *B01D 2253/25* (2013.01); *B01D 2257/302* (2013.01); *B01D 2257/304* (2013.01); *B01D 2257/306* (2013.01); *B01D 2257/404* (2013.01); *B01D 2257/504* (2013.01); *Y02C 20/40* (2020.08)

(58) Field of Classification Search
CPC ........ B01J 20/043; B01J 20/103; B01J 20/22; Y02C 20/40; B01D 53/62; B01D 53/81; B01D 2252/204; B01D 2252/106; B01D 2252/25; B01D 2257/404; B01D 2257/504
USPC ....................................................... 423/228
See application file for complete search history.

(56) References Cited

U.S. PATENT DOCUMENTS

| | | | | |
|---|---|---|---|---|
| 2008/0293976 A1* | 11/2008 | Olah | ................... | B01D 53/025 568/698 |
| 2010/0212495 A1* | 8/2010 | Gadkaree | .......... | B01J 20/28004 95/139 |

FOREIGN PATENT DOCUMENTS

WO    WO-2010091831 A1 *    8/2010    ......... B01D 53/0462

* cited by examiner

*Primary Examiner* — Anita Nassiri-Motlagh
(74) *Attorney, Agent, or Firm* — Renner Kenner Greive Bobak Taylor & Weber

(57) ABSTRACT

A method of modifying a chemical interaction between a functional group of an immobilized amine in a solid sorbent composition and a compound that chemically interacts with the functional group to reduce the heat required to desorb the compound from the solid sorbent. A method of inhibiting degradation of an immobilized amine in an immobilized (Continued)

amine solid sorbent. Compositions and methods of use of a low-cost regenerable immobilized amine solid sorbent resistant to degradation.

8 Claims, 6 Drawing Sheets

(51) Int. Cl.
*B01J 20/22* (2006.01)
*B01D 53/62* (2006.01)

LOW COST IMMOBILIZED AMINE REGENERABLE SOLID SORBENTS

STATEMENT REGARDING FEDERALLY SPONSORED RESEARCH AND DEVELOPMENT

This invention was made with government support under grant/award DOE-FC26-07NT43086 and DOE-FE0001780 awarded by the Department of Energy. The government has certain rights in the invention.

BACKGROUND OF THE INVENTION

The subject matter relates to methods for preparing low-cost regenerable immobilized amine solid sorbents, and compositions and methods for using the same to regenerably remove compounds such as $CO_2$, $SO_2$, or other acidic gases from a gas stream.

Sulfur dioxide ($SO_2$) in the flue gas of a coal-fired power plant is primarily removed by a wet scrubber method that involves use of large equipment requiring large amounts of energy and the generation of corrosive sulfate by-products. The fixed and operation costs of $SO_2$ removal due to the foregoing factors can be significantly decreased by using a solid sorbent process.

It has been shown that $SO_2$ can be strongly bound on the functional groups of an amine molecule that is immobilized on a solid surface. (Khatri, Rajesh A., et al. Thermal and Chemical Stability of Regenerable Solid Amine Sorbent for $CO_2$ Capture. Energy & Fuels (2006), 20(4), 1514-1520). However, due to this strong binding, $SO_2$ is not readily desorbed from the immobilized amine. Attempts to desorb $SO_2$ species at temperatures above 180° C. have caused the decomposition of the immobilized amines.

To improve the thermal stability of amines on solid sorbents, as well as eliminate degradation problems in the process of removing $CO_2$, $SO_2$, or other acidic gases from a gas stream, and reduce the overall cost of the $CO_2$, $SO_2$, or other acidic gases removal process, it has been found that the high temperature decomposition of an immobilized amine on a solid support can be inhibited by the presence of an alcohol species, such as glycol, in the process of producing the sorbent.

SUMMARY OF THE INVENTION

Provided is a method of modifying a chemical interaction between a functional group of an immobilized amine in a solid sorbent composition and a compound that chemically interacts with the functional group. Modifying the chemical interaction reduces the heat required to desorb the compound from the functional group compared to an unmodified chemical interaction between the functional group and the compound. Modification may be done by causing the chemical interaction between the functional group and the compound to take place in the presence of an alcohol species.

Further provided is a method comprising inhibiting degradation of a functional group of an immobilized amine in a solid sorbent composition. Inhibition may be accomplished by including an inorganic base in the solid sorbent composition.

Further provided is a regenerable immobilized amine solid sorbent composition. The composition may comprise a solid support particle and an immobilized amine. The immobilized amine may comprise an adhesive and an amine susceptible to adsorbing a compound. The sorbent composition may additionally comprise an alcohol species capable of lowering the threshold temperature for dissociation of a bond between the compound and the immobilized amine, and an inorganic base.

Further provided is a method of removing a compound from a gas stream. The method may comprise employing a regenerable solid sorbent in the gas stream. The regenerable solid sorbent may comprise an immobilized amine susceptible to chemosorbing the compound, an alcohol species capable of lowering the threshold temperature for dissociation of the bond between the compound and the amine, and an inorganic base. The method may further comprise allowing the regenerable solid sorbent to adsorb the compound from the gas stream, and heating the solid sorbent to a temperature above the threshold temperature for dissociation of the bond between the adsorbed compound and the immobilized amine, but below the threshold temperature for dissociation of the immobilized amine.

Further provided is a dual immobilized amine regenerable solid sorbent composition. The composition comprises solid support particles having pores, pore mouths and a non-porous surface area. The pores may comprise a composition of a first amine susceptible to chemosorbing a first compound, an alcohol species capable of lowering the threshold temperature for dissociation of a bond between the first compound and the first amine, an adhesive, and an inorganic base. The pore mouths and non-porous surface area may comprise a composition of a second amine susceptible to chemosorbing a second compound, an alcohol species capable of lowering the threshold temperature for dissociation of a bond between the second compound and the second amine, an adhesive, and an inorganic base.

Further provided, is a method of preparing a dual immobilized amine regenerable solid sorbent for adsorbing a first compound and a second compound. The method may comprise impregnating into pores of a solid support a first composition. The first composition may comprise a first amine susceptible to chemosorbing the first compound, an adhesive, an alcohol species capable of lowering the temperature for the dissociation of the bond between the first compound and the first amine, and an inorganic base. The pores may optionally be partially filled with a solvent after impregnating the pores with the first composition. The method may further comprise treating the resultant solid support with a second composition. The second composition may comprise a second amine susceptible to chemosorbing the second compound, an adhesive, an alcohol species capable of lowering the threshold temperature for dissociation of the bond between the second compound and the second amine, and an inorganic base. The method may further comprise, optionally, removing the solvent from the pores.

BRIEF DESCRIPTION OF THE DRAWINGS

By way of example only, certain non-limiting embodiments are described more fully hereinafter with reference tables and to the accompanying figures, wherein.

DETAILED DESCRIPTION OF ILLUSTRATIVE EMBODIMENTS

Figure 1:
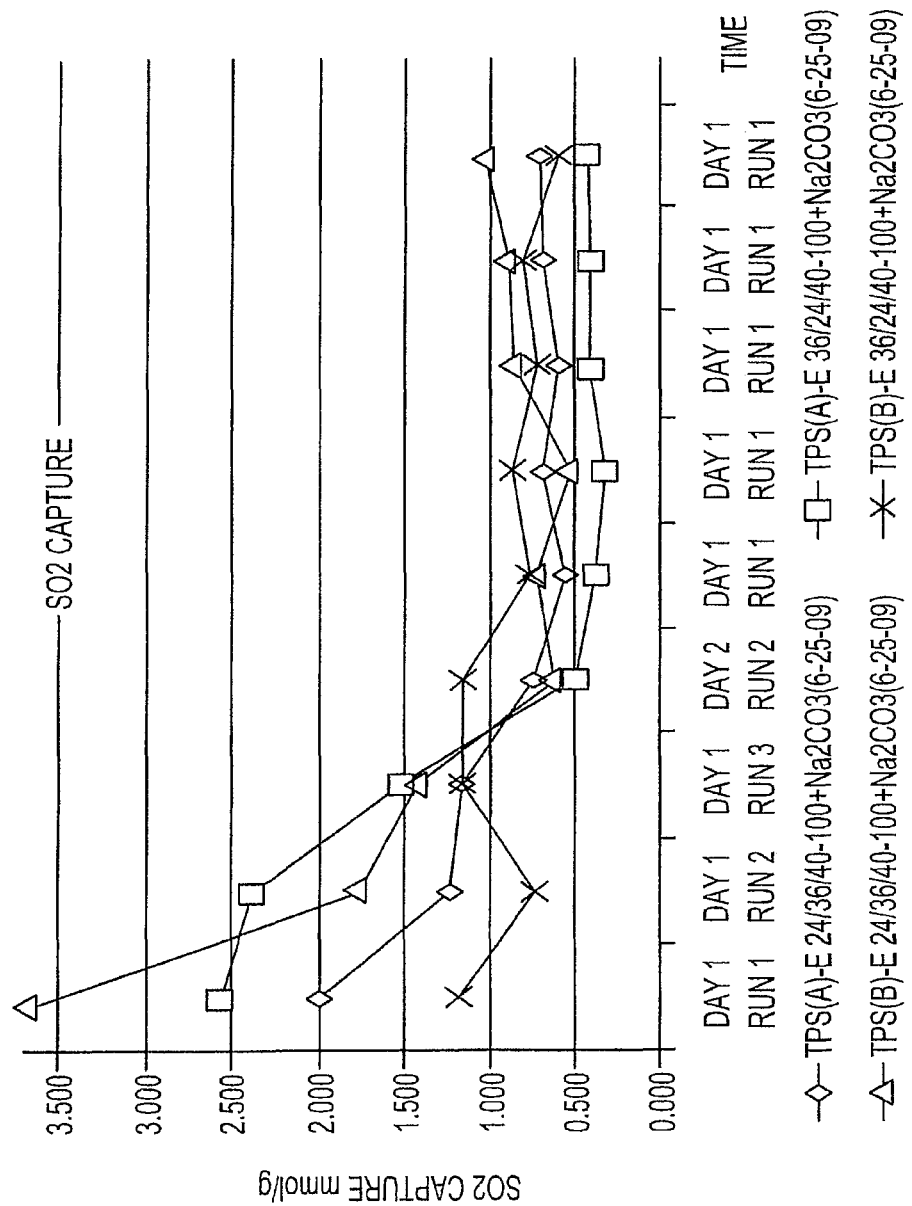
FIG. 1 is an explanatory graph of the $SO_2$ Capture Capacity of a TPS regenerable solid sorbent.

Provided is a method of modifying the chemical interaction of a compound with an immobilized amine to reduce the temperature at which the compound can be desorbed from the immobilized amine. The temperature at which the compound can be desorbed from the immobilized amine can be referred to as the desorption threshold temperature. The desorption threshold temperature can be lowered to a temperature below the temperature at which the immobilized amine would otherwise begin to decompose, or the immobilized amine decomposition threshold temperature. This method may not only lower the cost of the desorption process by lowering the energy needs for desorption, but may also make it possible to desorb compounds that have heretofore not been desorbable.

Also provided is a method of reducing degradation of immobilized amine solid sorbents and a method and composition for removing a desired compound from a gas stream while resisting compounds in the gas stream that would otherwise block removal of the desired compound or cause degradation.

The foregoing methods make possible the production of a low-cost regenerable immobilized amine solid sorbent resistant to degradation. The sorbent composition comprises a solid support containing thereon an immobilized amine. The sorbent can be considered regenerable when it can be exposed to many cycles of adsorbing and desorbing a compound with little or no decomposition of the sorbent. Many cycles can be, for example, and without limitation more than 350 cycles, more than 400 cycles, more than 450 cycles, or more than 500 cycles. In addition, the sorbent composition can be prepared in a manner that inhibits degradation of the immobilized amine and its adsorbent ability. Cost of producing the sorbent, the materials used in the sorbent, and the energy required to desorb compounds from the sorbent can be reduced or minimized.

An immobilized amine is a complex in which individual neighboring molecules of the amine have become stationary, or immobilized, relative to one another and possibly a fixed object, such as a solid support particle or a large molecule. In one method, an amine becomes an immobilized amine due to the linking of a fraction of the amine functional groups on individual neighboring amine molecules. Given the proclivity of amines to form bonds with organic compounds, an organic adhesive can be mixed with an amine to bind with a fraction of the amine functional groups on individual amine molecules to cause the linking of the amine functional groups. As the adhesive cures, generally at a temperature of between about 20° C. and 160° C., it links neighboring amine molecules together forming an immobilized amine. Prior to curing, the amine/adhesive mixture can then be impregnated on a solid support so that curing of the adhesive will immobilize the amine with respect to the solid support as well. The adhesive is selected based on considerations such as thermal and chemical stability in the immobilized amine, but any chemical compound containing a functional group that reacts chemically with the amine may be an adhesive candidate. In certain embodiments, the adhesive may be an epoxy, such as, for example and without limitation, a bisphenol epoxy, diglycidyl ether of bisphenol A (DGEBA), EPON-828, or mixtures thereof. The In certain embodiments, the adhesive may be selected from other polymers such as a compound containing isocynate, such as 2,4-tolylene diisocyanate dimer.

The foregoing method can work with any degree of amine, including but not limited to primary and secondary amines. Although secondary amines generally exhibit a better attraction for chemical absorbency, secondary amines can be expensive. Due to the high cost of secondary amines, the method of immobilizing amines for use in solid sorbents can be useful in lowering the cost of immobilized amine sorbents by allowing use of lower cost primary amines. In particular, the process of bonding an adhesive to a primary group transforms the primary group into a secondary amine functional group. Thus, immobilization can not only prevent an amine from corroding away, but also can be an effective method for lowering the cost of a solid sorbent without sacrificing performance.

In addition, the amines that can be used comprise aliphatic amines, aromatic amines, or mixtures thereof. While the functional groups on both aliphatic and aromatic amines can attract and adsorb a wide variety of compounds, both have properties that can be utilized for particular purposes. For example, aliphatic amines exhibit the properties of a strong base and can be used to adsorbed compounds that exhibit properties of a weak acid, such as, for example, $CO_2$. Similarly, aromatic amines exhibit the properties of a weak base, and can be used to adsorbed compounds that exhibit the properties of a strong acid, such as sulfur compounds, for example $SO_2$.

Unfortunately, certain compounds form bonds when they chemically adsorb with an immobilized amine that are stronger than the bonds between the adhesive and the amine in the immobilized amine. For such compounds, regeneration of the sorbent by desorption of the compound has not been possible. One example of such a compound, as mentioned above, is $SO_2$. The bonds of an $SO_2$ chemically adsorbed on an immobilized amine have been heated to temperatures of greater than 180° C. without desorbing. At this temperature, the immobilized amine decomposes.

Provided is a method of lowering the desorption threshold temperature of compounds that chemically adsorb on an immobilized amine sorbent, by causing the compounds to adsorb on the immobilized amine in the presence of an alcohol species. Typical operating temperatures at which compounds can be adsorbed can be between 20° C. and 80° C. It has been found that an alcohol species can modify the chemical interaction of compounds with the functional groups of the immobilized amine. The modification causes the adsorbed compounds to desorb at a lower temperature compared to when the reaction is not modified. Chemical adsorption can be caused to occur in the presence of an alcohol species, for example, by including the alcohol species in the immobilized amine composition. If the alcohol species is present during the curing stage in the process of preparing the immobilized amine, the alcohol species is present during the chemical interaction. The sorbent also can be suspended in the alcohol species and then introduced to a stream containing the compound to be adsorbed. Another alternative can be to inject an alcohol species mist into a gas stream containing the compound to be adsorbed so that both compound and alcohol species are carried to the adsorption site. The amount of the alcohol species present in the composition can be determined by infra-red spectroscopy. The alcohol species in the composition can be any compound comprising a C—OH group including, but not limited to, alcohols, diols and triols. Some non-limiting examples of alcohols include polyethylene glycol, polyvinyl alcohol, or mixtures thereof.

Also provided is a method of inhibiting degradation of the functional groups of the immobilized amine. In certain gas streams, such as, for example, flue gas, acidic gases can be present. A gas stream may comprise acidic gases such as sulfur compounds, such as sulfur dioxide ($SO_2$), hydrogen sulfide ($H_2S$), carbonyl sulfide (COS), $CS_2$, thiopene, dibenzothiophene, tetrahydrothiophene (THT), dimethyl sulfide (DMS), mercaptan, tertbutylmercaptan (TBM), 2-methyl-2propanethiol, 1-propanethiol, isobutanethiol, 2-butanethiol, 1-butanethiol, 1-pentanethiol, 1-hexanethiol, and 1-heptanethiol. A gas stream may comprise acidic gases such as, nitrogen compounds, such as nitric oxide and nitrogen oxide. A gas stream may comprise other acidic gases such as, carbon dioxide. These and other acidic gases can react with a functional group on the immobilized amine, or form compounds that can react with the functional groups, permanently altering the functional group and diminishing the sorbents regenerable sorbent capacity or decomposing the immobilized amine. It has been found that degradation of the amine functional groups can be inhibited with the addition of an inorganic base. An inorganic base may comprise any of the carbonates, bicarbonates, or hydroxyls of any alkali metal or alkali-earth metal. Some non-limiting examples of inorganic bases include $Na_2CO_3$ and NaOH.

A sorbent formulation can contain a solid support, an adhesive, an amine, an alcohol species, and an inorganic base. The solid support can be selected based on considerations such as its chemically inert nature with respect to the amine functional group The particles of the solid support can be porous or non-porous and may comprise, for example and without limitation, oxides, such as $SiO_2$, alumina, calcia, magnesia, or mixtures thereof; metals, for example and without limitation, iron, aluminum, aluminum alloys, steel, steel alloys; carbon materials, for example and without limitation, activated carbon; or combinations thereof.

The composition can be prepared by mixing the ingredients and impregnating the mixture onto a solid support using impregnation methods known in the art. A solvent can be employed to dissolve the ingredients for thorough mixing, and later removed to allow the adhesive to cure. Solvents may comprise water, organic solvents such as alcohols, ketones, tetrahydrofuran (THF), chlorinated hydrocarbons, aliphatic and aromatic hydrocarbons, or combinations thereof. In certain embodiments, a solvent may be used to wash the solid support to remove excess or un-reacted amine, adhesive, alcohol species and inorganic base. If pellets or granules are desired instead of a powder, the adhesive can be allowed to bond not only between neighboring amine molecules on the same solid support particle, but across particles to bond particles together. A polymer template can be employed to achieve pellets or granules of the desired morphology. The polymer used as a template should not be reactive toward the amine employed on the sorbent or the adhesive. Some non-limiting examples of polymer templates can be, PEG500, polyvinyl alcohol, or any other water-soluble polymers, or mixtures thereof. Following curing of the amine/adhesive around the polymer template, the polymer template can be washed off to produce void space, serving as macropores and/or micropores to facilitate diffusion of a compound through the sorbent. The entire process can be completed at temperatures between −196° C. and 250° C.

The present subject matter provides for employing the desorption modified immobilized amine regenerable solid sorbent in a gas stream. The sorbent is placed into the gas stream at an operating temperature. The operating temperature can be between 20° C. and 80° C., or between 30° C. and 70° C., or even between 40° C. and 60° C. The sorbent can reside in the gas stream until an amount of a desired compound has adsorbed onto the sorbent. The sorbent may then heated to a temperature above the modified desorption temperature of the chemically adsorbed compound, but below the decomposition threshold temperature of the immobilized amine in the sorbent. Immobilized amines can begin decomposing at around 120° C. and the present subject matter allows desorption to occur between 60° C. and 120° C., or 70° C. and 110° C., or 80° C. and 100° C. When the compound has been sufficiently, fully or partially, desorbed and the amine functional groups are sufficiently, fully or partially, regenerated, the sorbent may be placed back into the gas stream for further adsorption.

In certain embodiments, the subject matter can be used to remove $SO_2$ from flue gas. In an un-modified immobilized amine sorbent, the desorption threshold temperature of $SO_2$ can be greater than 180° C., which would cause the decomposition of the un-modified immobilized amine. Creating an immobilized amine with an alcohol species such as polyethylene glycol makes it possible to desorb $SO_2$ at less than 100° C. In certain embodiments, the subject matter can be used to remove $CO_2$ from flue gas. By causing $CO_2$ to be adsorbed in the presence of a polyethylene glycol, $CO_2$ can be desorbed at temperatures as low as 70° C.

The removal of multiple components from a gas stream is also contemplated. A sorbent prepared to handle the challenges of a multi-component gas stream can include a porous solid support with a non-porous surface area. A first composition of an amine, an adhesive, an alcohol species and an inorganic base can be impregnated into the pores of the solid support. A second composition of an amine, an adhesive, an alcohol species and an inorganic base can be impregnated onto the pore mouths and non-porous surface area of the solid support. To keep the second composition out of the pores, the pores can be filled with a solvent, such as, without limitation, water or an organic solvent, after the pores are impregnated with the first composition. When the second composition has been impregnated and cured, the solvent in the pores can be removed, for example, by drying. In addition, before impregnation of the second composition, the first composition can be treated with the compound desired to be adsorbed to allow the amine functional groups to bind with the compound. This dual amine structure can be used to target specific compounds desired to be adsorbed from the gas stream, or for targeting a specific compound while providing alternative sites for adsorbing compounds that would otherwise interfere with the adsorption of the specific compound.

In certain embodiments, a sorbent is prepared to handle the challenges of removing CO, from flue gas containing sulfur compounds and nitrogen compounds. A first immobilized composition is prepared containing an aliphatic amine, a bisphenol epoxy, a polyethylene glycol and $Na_2CO_3$. The ingredients are dissolved in ethanol (EtOH) and impregnated into the pores of a $SO_2$ support. The EtOH is removed by evaporation and the epoxy is allowed to cure, immobilizing the amine. The particles are treated with $CO_2$ to allow the amine functional groups to bind with $CO_2$ molecules. The pores are then filled with water to just below the pore mouths and a second composition is prepared. The second composition contains an aromatic amine, a bisphenol epoxy, polyethylene glycol and $Na_2CO_3$. The second composition is dissolved in EtOH and impregnated onto the pore mouths and non-porous surface area of the SiO2 particles. The EtOH is removed and the second composition is allowed to cure. The water is removed from the pores and the sorbent is ready to remove $CO_2$. In this embodiment, the dual amine structure allows $CO_2$ to adsorb onto the immobilized amine within the pores, while providing sites on the immobilized amine support surface and pore mouths for the adsorption of sulfur compounds and sulfur by-products as well as nitrogen compounds that would otherwise interfere with the adsorption of the $CO_2$.

It will be apparent to those skilled in the art that there may be changes and modifications made to the embodiments described in the examples without departing from the general scope of the provided subject matter. The provided subject matter is intended to include all such modifications and alterations in so far as they come within the scope of the appended claims or the equivalents thereof.

EXAMPLES

Example 1

Preparation of Novel Regenerable Solid Sorbent Formulation

Preparation of 10 g of "TPS 24/36/40"

6 g of TEPA (tetraethylene pentamine) was stirred with 9 g of PEG (polyethylene glycol 200). A roughly equal volume of EtOH (ethanol) was added to beaker with stirring. The mixture was then poured onto log Silica and stirred until the sorbent was coated properly. The mixture may look like lemon slush when coated properly. The sorbent was then baked at 100° C. until all of the EtOH has evaporated.

Epoxy Doping 0.444 g of an epoxy adhesive (EPON) was dissolved in 6-7 g EtOH. A hot plate at 70° C. was employed to help dissolution. The EPON/EtOH mixture was then poured on the 10 g of TPS 24/36/40 and uniformly mixed and baked at 100° C. until all of the EtOH was evaporated.

$Na_2CO_3$ Addition

One log of epoxy doped sorbent (the sorbent is denoted as TPS 24/36/40-0.222Epon) is weighed out and combined with 0.1 g $Na_2CO_3$ dissolved in 6 g of water. The mixture was stirred until all sorbent was coated and then baked in an oven at 100° C. until all the water evaporated. When all water evaporated, the final product was an opaque white.

Example 2

Preparation and Determination of Regenerable $SO_2$ and $CO_2$ Capture Capacity of Novel Regenerable Solid Sorbent Composition A procedure similar to that of example 1, using a sequential impregnation method and a different sequence was used to prepare four sorbents using two different silica, a granular silica (A) and a powder silica (B). The amount of the raw materials used is listed in Table 1.

TABLE 1

Compositions of the sorbents prepared in weights

| Sample Label | EPON | TEPA | PEG | Ethanol | $SiO_2$ | $Na_2CO_3$ | Water |
|---|---|---|---|---|---|---|---|
| TPS(A)-E 24/36/40-100 + $Na_2CO_3$ | 0.355 | 0.96 | 1.44 | 4 | 1.6 | 0.4 | 2.4 |
| TPS(A)-E 36/24/40-100 + $Na_2CO_3$ | 0.267 | 0.267 | 1.44 | 6 | 1.6 | 0.4 | 2.4 |
| TPS(B)-E 24/36/40-100 + $Na_2CO_3$ | 0.355 | 0.96 | 1.44 | 4 | 1.6 | 0.4 | 2.4 |
| TPS(B)-E 36/24/40-100 + $Na_2CO_3$ | 0.267 | 1.44 | 0.96 | 6 | 1.6 | 0.4 | 2.4 |

Preparation of TPS(A) 24/36/40 (for Roughly 4 g)

Mixed the epoxy (EPON) with TEPA and stirred until the EPON dissolved in the TEPA. Added PEG to the EPON/TEPA mixture and stirred well. Impregnated the mixture onto silica and added ethanol to the silica slurry. The sorbent was heated in an oven at 100° C. to evaporate excess ethanol.

Na2CO3 Addition

Dissolved 0.04 g of $Na_2CO_3$ in water and impregnated the $Na_2CO_3$ solution onto the above sorbent. The sorbent was heated in an oven at 100° C. to evaporate excess water to obtain an opaque white sorbent.

The $SO_2$ and $CO_2$ capture capacity of these sorbents was determined by the following procedures. In each run, the sorbents were heated for seven minutes in an oven at 100° C. to remove any adsorbed species $CO_2$ from the ambient atmosphere. The samples were then saturated with 99% $SO_2$ or pure CO2 in continuous flow for 10 minutes. The difference in the weight of the sample before and after the capturing was the amount of $SO_2$ or $CO_2$ captured by the particular sorbent. These sorbents were again heated in an oven at 100° C. to remove the saturated $CO_2$ and further tested for capture capacity. Ten runs are carried out and the $SO_2$ or $CO_2$ captured in each individual cycle is calculated. The tested sorbents were kept in oven at 100° C. overnight for evaluation of thermal degradation. These sorbents were further evaluated for $SO_2$ capture for 3 cycles on day 2 and day 3. The sorbent prepared with powder $SiO_2$ and 24% TEPA and 36% PEG showed the highest $SO_2$ capture capacity after three days of degradation studies. The results of $SO_2$ capture for each run are presented in the graph in FIG. 1 and the results for $CO_2$ capture are presented in the graph in FIG. 2.

Figure 2:
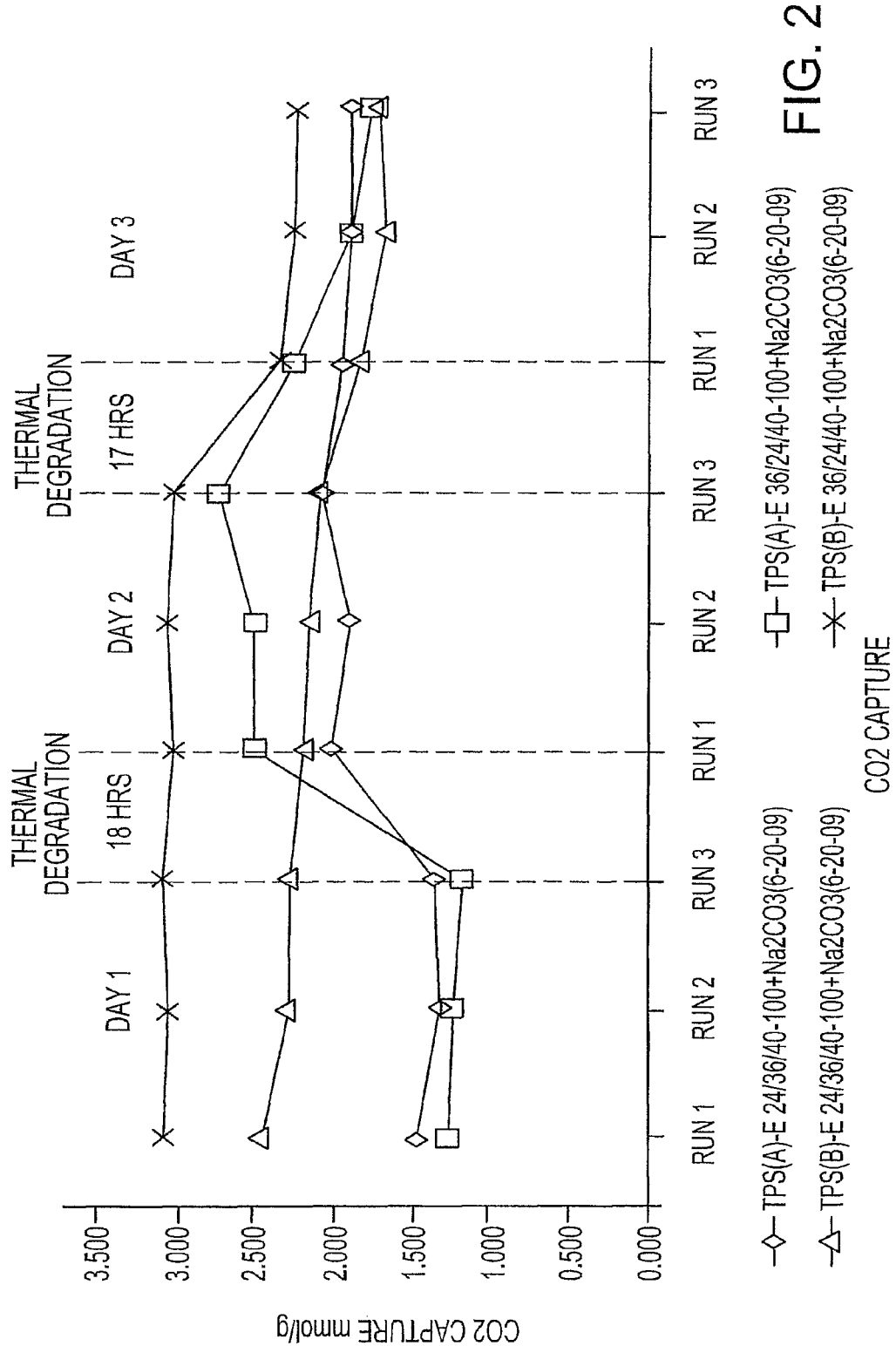
FIG. 2 is an explanatory graph of the $CO_2$ Capture Profiles of a TPS regenerable solid sorbent.

The data in FIG. 2 represent one of the best sets of data obtained from more than 50 sorbents prepared and tested. These sorbents were subjected to more 35 hours of thermal degradation study at 100° C. in air. In this study, the adsorption of $CO_2$ was carried out at 30° C. and desorption at 100° C. The $CO_2$ capture capacity was measured before, during, and after thermal degradation studies.

Two of the above sorbents have also been tested by ADA Environmental Solution ( ) by adsorption at 55° C. with 12% $CO_2$, 4% O2, balance $N_2$ and desorption at 80-95° C. The $CO_2$ capture capacity and stability results obtained by ADA were consistent with those reported in FIG. 2.

With respect to $CO_2$ capture, we are able to prepare a solid amine sorbent with $CO_2$ capture capacity of more than 1.5 mmol/g. The sorbent did not degrade under more than 35 hour of thermal treatment. It is expected that this sorbent will sustain more than 500 $CO_2$ adsorption/desorption cycles without significant degradation.

Example 2

$CO_2$, $SO_2$, $H_2S$ and NO Capture Over M-Phenyldiamine/PEG/EPON/$SiO_2$ Sorbents The following examples show that m-phenyldiamine/PEG/EPON/SiO2+Na2CO3 sorbents exhibited capture capacity for $CO_2$, SO2, H2S, and NO. M-phenyldiamine is an aromatic amine. PEG is a glycol, EPON is an epoxy.

Experimental

Sorbent Preparation

For convenience the chemicals in the present study are abbreviated as follows, polyethylene glycol-200 (PEG; P) EPON-826 (EPON; E), m-phenyldiamine (Ph), $SiO_2$ (S). Two forms of silica were used in this study Tixosil 68 (A) and (B). The sorbent are abbreviated in the following notation and abbreviated as PhPS-E10 24/36/50+$Na_2CO_3$ for 24 wt % Ph-36 wt % P-40 Wt % S-E(10-mole ratio or EPON/TEPA)+$Na_2CO_3$.

The m-phenyldiamine/PEG/EPON/$SiO_2$+$Na_2CO_3$ sorbents were prepared by dissolving EPON in PEG/ethanol solution under stirring for 5 min followed by addition of m-phenyl diamine pellets. Silica was impregnated with the above mixture and dried in oven at 100° C. for 15-20 min until excess ethanol is evaporated. Aqueous solution of $Na_2CO_3$ was added to the solid sorbent and dried in oven at 100° C. for 15-20 min to remove the excess water. The specific compositions of sorbents are presented in Table 2.

TABLE 2

The composition of the different components used in the preparation of sorbents.

| Sample Label | Ph (g) | PEG (g) | $SiO_2$ (g) | EPON (g) | $Na_2CO_3$ | Water (g) | Ethanol (g) |
|---|---|---|---|---|---|---|---|
| PhPS(A)-$E_{20}$ 24/36/40-100 + $Na_2CO_3$ | 2.4 | 3.6 | 4 | 0.444 | 0.04 | 2.4 | 1 |
| PhPS(A)-$E_{10}$ 36/24/40-100 + $Na_2CO_3$ | 3.6 | 2.4 | 4 | 0.666 | 0.04 | 2.4 | 1 |
| PhPS(B)-$E_{20}$ 24/36/40-100 + $Na_2CO_3$ | 2.4 | 3.6 | 4 | 0.444 | 0.04 | 2.4 | 2.5 |
| PhPS(B)-$E_{20}$ 36/24/40-100 + $Na_2CO_3$ | 3.6 | 2.4 | 4 | 0.666 | 0.04 | 2.4 | 2.5 |

*removed upon drying $CO_2$ Capture

The $CO_2$ capture capacity of the sorbents is determined by the following procedures. In each run, the sorbents are heated for seven min in an oven at 100° C. to remove any adsorbed $CO_2$ from the ambient atmosphere. Then the samples are saturated with pure $CO_2$ in continuous flow for 10 min. The difference in the weight of the sample before and after the $CO_2$ capture is considered as the amount of $CO_2$ captured by the particular sorbent. The sorbents are again heated in oven at 100° C. to remove the captured $CO_2$ and repeat the above steps for further $CO_2$ capture capacity. The $SO_2$, $H_2S$, and NO capture capacity are determined in the same procedures.

Results and Discussion

Figure 3:
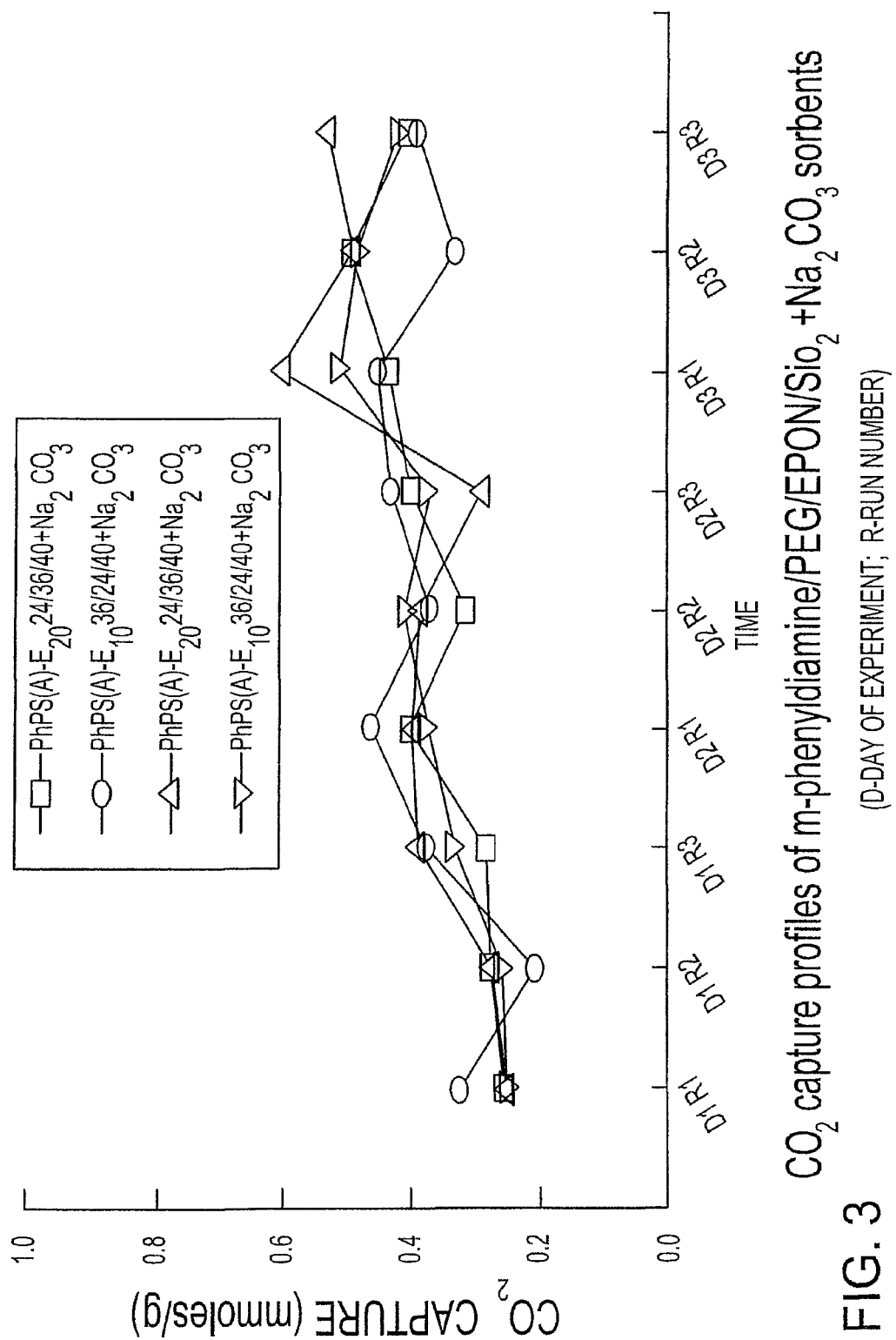
FIG. 3 is an explanatory graph of the $CO_2$ Capture Capacity of a PhPS regenerable solid sorbent.

FIG. 3 and Table 3 show the $CO_2$ capture capacity over m phenyldiamine/PEG/EPON/$SiO_2$+$Na_2CO_3$ sorbents. The capture capacity marginally increases during the first day. Treatment of the sorbents in oven at 100° C. for 15 h and retested for $CO_2$ capture resulted in an increase in the $CO_2$ capture capacity. Further treatment in oven at 100° C. for another 15 h resulted in a small increase in the $CO_2$ capture capacity. The increase in $CO_2$ capture capacity is more prominent in case of $SiO_2$ (B) support.

Figure 4:
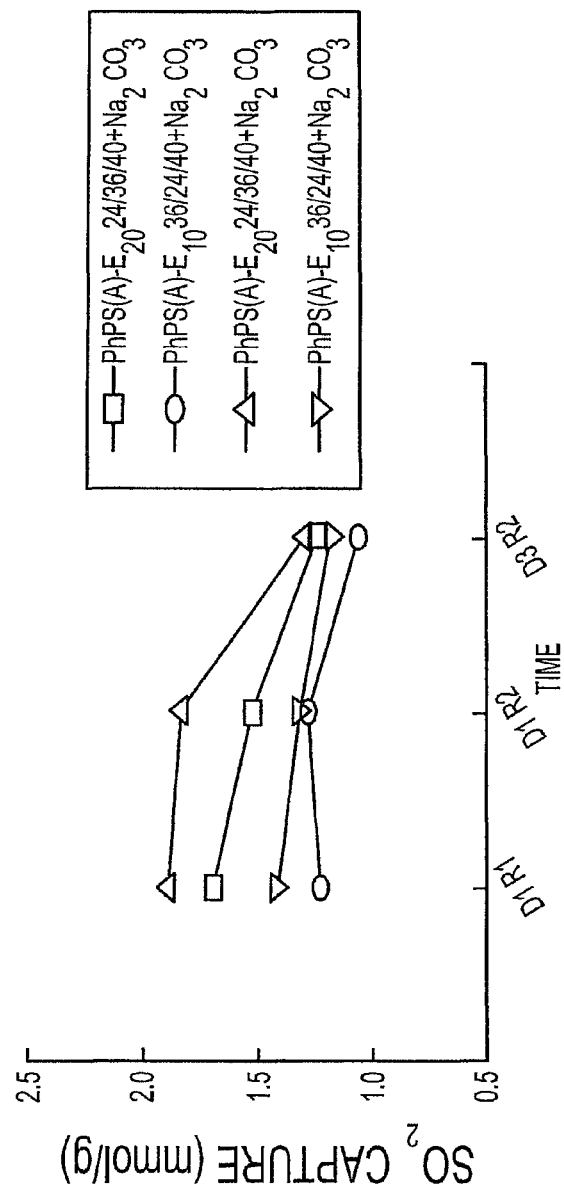
FIG. 4 is an explanatory graph of the $SO_2$ Capture Profiles of a PhPS regenerable solid sorbent.

FIG. 4 and Table 4 show the $SO_2$ capture over m-phenyldiamine/PEG/EPON/$SiO_2$+$Na_2CO_3$ sorbents. The PhPS (B)-E 24/36/40-100+$Na_2CO_3$ sorbent exhibits the highest $SO_2$ capture capacity. No further heat treatment was performed on these sorbents.

Figure 5:
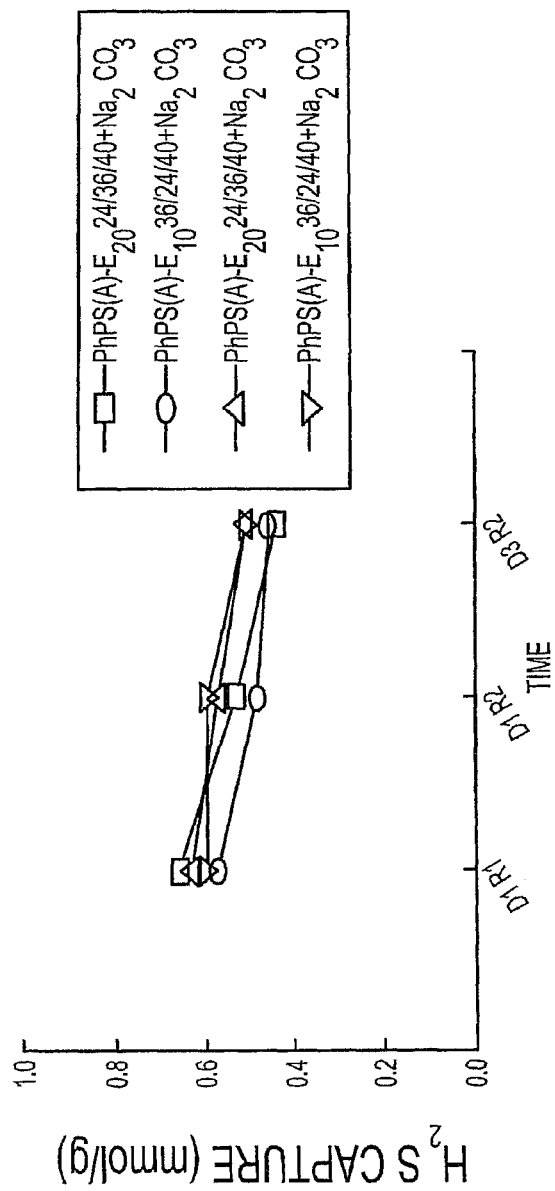
FIG. 5 is an explanatory graph of the $H_2S$ Capture Profiles of a PhPS regenerable solid sorbent.

FIG. 5 and Table 5 shows the $H_2S$ capture capacity over m phenyldiamine/PEG/EPON/$SiO_2$+$Na_2CO_3$ sorbents. The capture capacity remains constant on three run.

Figure 6:
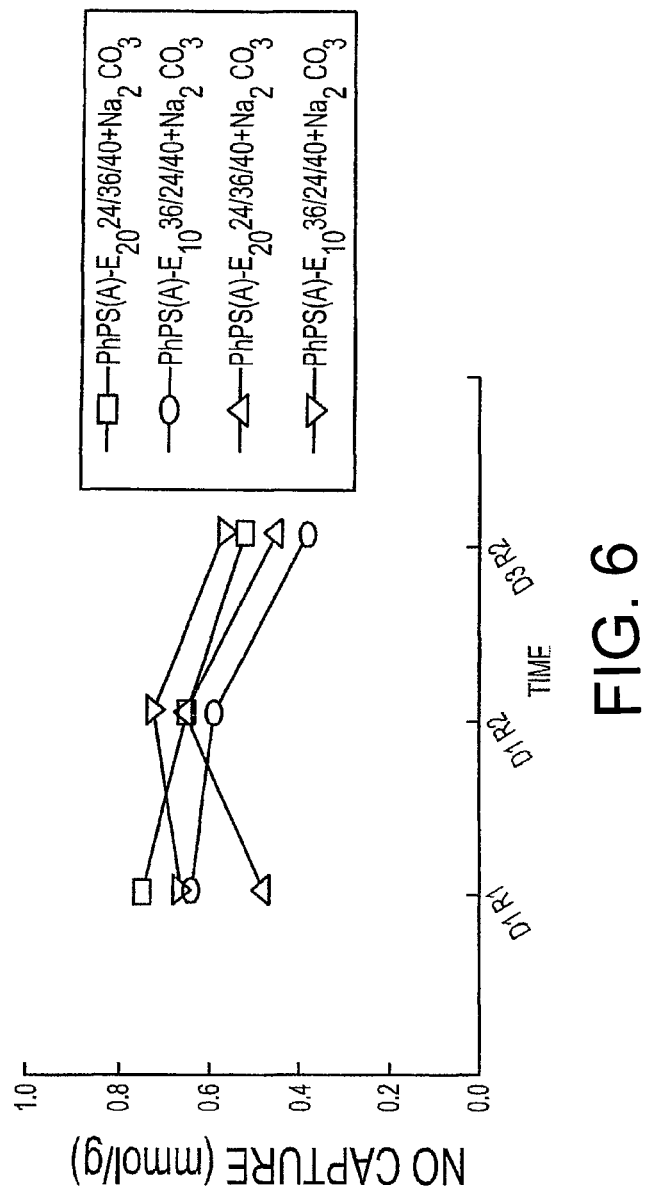
FIG. 6 is an explanatory graph of the NO Capture Profiles of a PhPS regenerable solid sorbent.

FIG. 6 and Table 6 shows NO capture capacity over m-phenyldiamine/PEG/EPON/$SiO_2$+$Na_2CO_3$ sorbents. The capture capacity remains constant on three run.

CO$_2$ Capture

TABLE 3

Results of CO$_2$ capture of m-phenyldiamine/PEG/EPON/SiO$_2$ + Na$_2$CO$_3$ sorbents in three successive days

| Sorbent | CO$_2$ Capture (mmol)/g | | | mol CO$_2$/mol Ph | | |
|---|---|---|---|---|---|---|
| | Run 1 | Run 2 | Run 3 | Run 1 | Run 2 | Run 3 |
| Day 1 (Fresh samples) | | | | | | |
| PhPS(A)-E$_{20}$ 24/36/40-100 + Na$_2$CO$_3$ | 0.254 | 0.278 | 0.280 | 0.028 | 0.031 | 0.031 |
| PhPS(A)-E$_{10}$ 36/24/40-100 + Na$_2$CO$_3$ | 0.322 | 0.207 | 0.374 | 0.035 | 0.023 | 0.042 |
| PhPS(B)-E$_{20}$ 24/36/40-100 + Na$_2$CO$_3$ | 0.248 | 0.272 | 0.296 | 0.027 | 0.029 | 0.032 |
| PhPS(B)-E$_{10}$ 36/24/40-100 + Na$_2$CO$_3$ | 0.258 | 0.259 | 0.331 | 0.029 | 0.029 | 0.037 |
| Day 2 (after first thermal degradation at 100° C. for 15 h) | | | | | | |
| PhPS(A)-E$_{20}$ 24/36/40-100 + Na$_2$CO$_3$ | 0.399 | 0.313 | 0.399 | 0.054 | 0.043 | 0.054 |
| PhPS(A)-E$_{10}$ 36/24/40-100 + Na$_2$CO$_3$ | 0.458 | 0.372 | 0.429 | 0.063 | 0.051 | 0.059 |
| PhPS(B)-E$_{20}$ 24/36/40-100 + Na$_2$CO$_3$ | 0.383 | 0.384 | 0.287 | 0.058 | 0.059 | 0.044 |
| PhPS(B)-E$_{10}$ 36/24/40-100 + Na$_2$CO$_3$ | 0.376 | 0.406 | 0.377 | 0.052 | 0.056 | 0.052 |
| Day 3 (after second thermal degradation at 100° C. for 15 h) | | | | | | |
| PhPS(A)-E$_{20}$ 24/36/40-100 + Na$_2$CO$_3$ | 0.435 | 0.493 | 0.406 | 0.060 | 0.069 | 0.056 |
| PhPS(A)-E$_{10}$ 36/24/40-100 + Na$_2$CO$_3$ | 0.451 | 0.331 | 0.391 | 0.065 | 0.048 | 0.056 |
| PhPS(B)-E$_{20}$ 24/36/40-100 + Na$_2$CO$_3$ | 0.559 | 0.493 | 0.528 | 0.088 | 0.078 | 0.083 |
| PhPS(B)-E$_{10}$ 36/24/40-100 + Na$_2$CO$_3$ | 0.514 | 0.484 | 0.423 | 0.074 | 0.070 | 0.061 |

SO$_2$ Capture

TABLE 4

Results of SO$_2$ capture on m-phenyldiamine/PEG/EPON/SiO$_2$ + Na$_2$CO$_3$ sorbents
Day 1 (fresh samples)

| Sorbent | SO$_2$ Capture (mmol/g) | | | mol SO$_2$/mol Ph | | |
|---|---|---|---|---|---|---|
| | Run 1 | Run 2 | Run 3 | Run 1 | Run 2 | Run 3 |
| PhPS(A)-E$_{20}$ 24/36/40-100 + Na$_2$CO$_3$ | 1.698 | 1.537 | 1.257 | 0.186 | 0.168 | 0.138 |
| PhPS(A)-E$_{10}$ 36/24/40-100 + Na$_2$CO$_3$ | 1.231 | 1.032 | 1.080 | 0.137 | 0.114 | 0.120 |
| PhPS(B)-E$_{20}$ 24/36/40-100 + Na$_2$CO$_3$ | 1.890 | 1.844 | 1.297 | 0.211 | 0.206 | 0.145 |
| PhPS(B)-E$_{10}$ 36/24/40-100 + Na$_2$CO$_3$ | 1.424 | 1.324 | 1.260 | 0.161 | 0.149 | 0.142 |

H$_2$S Capture

TABLE 5

Results of the H$_2$S capture on m-phenyldiamine/PEG/EPON/SiO$_2$ + Na$_2$CO$_3$ sorbents
Day 1 (Fresh samples)

| Sorbent | H$_2$S Capture (mmol)/g | | | mol H$_2$S/mol Ph | | |
|---|---|---|---|---|---|---|
| | Run 1 | Run 2 | Run 3 | Run 1 | Run 2 | Run 3 |
| PhPS(A)-E$_{20}$ 24/36/40-100 + Na$_2$CO$_3$ | 0.645 | 0.526 | 0.439 | 0.070 | 0.057 | 0.048 |
| PhPS(A)-E$_{10}$ 36/24/40-100 + Na$_2$CO$_3$ | 0.570 | 0.480 | 0.450 | 0.063 | 0.053 | 0.050 |
| PhPS(B)-E$_{20}$ 24/36/40-100 + Na$_2$CO$_3$ | 0.623 | 0.563 | 0.505 | 0.068 | 0.062 | 0.056 |
| PhPS(B)-E$_{10}$ 36/24/40-100 + Na$_2$CO$_3$ | 0.592 | 0.594 | 0.506 | 0.065 | 0.065 | 0.056 |

NO Capture

TABLE 6

Results of the NO capture on m-phenyldiamine/PEG/EPON/SiO$_2$ + Na$_2$CO$_3$ sorbents

| Sorbent | NO Capture (mmol/g) | | | mol NO/mol Ph | | |
|---|---|---|---|---|---|---|
| | Run 1 | Run 2 | Run 3 | Run 1 | Run 2 | Run 3 |
| PhPS(A)-E$_{20}$ 24/36/40-100 + Na$_2$CO$_3$ | 0.675 | 0.607 | 0.508 | 0.074 | 0.067 | 0.056 |
| PhPS(A)-E$_{10}$ 36/24/40-100 + Na$_2$CO$_3$ | 0.622 | 0.588 | 0.381 | 0.070 | 0.066 | 0.043 |

TABLE 6-continued

Results of the NO capture on m-phenyldiamine/PEG/EPON/SiO$_2$ + Na$_2$CO$_3$ sorbents

| Sorbent | NO Capture (mmol/g) | | | mol NO/mol Ph | | |
|---|---|---|---|---|---|---|
| | Run 1 | Run 2 | Run 3 | Run 1 | Run 2 | Run 3 |
| PhPS(B)-E$_{20}$ 24/36/40-100 + Na$_2$CO$_3$ | 0.471 | 0.607 | 0.439 | 0.052 | 0.067 | 0.048 |
| PhPS(B)-E$_{10}$ 36/24/40-100 + Na$_2$CO$_3$ | 0.631 | 0.666 | 0.534 | 0.068 | 0.072 | 0.058 |

In the preceding description, where a range of values has been provided, it is understood that each intervening value between the upper and lower limit of that range and any other stated or intervening value in that stated range is encompassed within the subject matter. Unless defined otherwise, all technical and scientific terms used herein have the same meaning as commonly understood by one of ordinary skill in the art to which this subject matter belongs. Although any methods and materials similar or equivalent to those described herein can also be used in the practice or testing of the present subject matter, a limited number of the exemplary methods and materials are described herein.

It must be noted that as used herein and in the appended claims, the singular forms "a", "an", and "the" include plural referents unless the context clearly dictates otherwise.

What is claimed is:

1. A method of removing a compound from a gas stream comprising:
    a. employing a regenerable solid sorbent in the gas stream, wherein the regenerable solid sorbent comprises,
        i. an immobilized amine susceptible to chemosorbing the compound,
        ii. an alcohol species capable of lowering the threshold temperature for dissociation of the bond between the compound and the amine, and
        iii. Na$_2$CO$_3$ as an inorganic base,
    b. allowing the regenerable solid sorbent to adsorb the compound from the gas stream, and;
    c. heating the solid sorbent to a temperature above the threshold temperature for dissociation of a bond between the adsorbed compound and the immobilized amine, but below the threshold temperature for dissociation of the immobilized amine.

2. The method of claim 1 wherein the gas stream is flue gas, the adsorbed compound is CO$_2$, the amine is an aliphatic amine, and the alcohol species is a polyethylene glycol.

3. The method of claim 1 wherein the gas stream is flue gas and the adsorbed compound is SO$_2$, the amine is an aromatic amine, and the alcohol species is a polyethylene glycol.

4. A regenerable immobilized amine solid sorbent composition comprising:
    a. a solid support particle,
    b. an immobilized amine,
        i. wherein the immobilized amine comprises an adhesive and an amine susceptible to adsorbing a compound,
    c. an alcohol species capable of lowering the threshold temperature for dissociation of a bond between the adsorbed compound and the immobilized amine, and;
    d. Na$_2$CO$_3$ as an inorganic base.

5. The composition of claim 4 wherein the solid support particle is SiO2.

6. The composition of claim 4 wherein the amine is an aliphatic or aromatic amine.

7. The composition of claim 4 wherein the adhesive is an epoxy.

8. The composition of claim 4 wherein the alcohol species is a polyethylene glycol.

* * * * *